US008876168B2

(12) United States Patent
Pompeii (10) Patent No.: US 8,876,168 B2
(45) Date of Patent: Nov. 4, 2014

(54) ADAPTER RING FOR PRE-FILTER IN CHEMICAL, BIOLOGICAL AND RADIOLOGICAL ENVIRONMENTS

(75) Inventor: Michael A. Pompeii, Fredericksburg, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 370 days.

(21) Appl. No.: 13/199,961

(22) Filed: Aug. 25, 2011

(65) Prior Publication Data

US 2012/0313370 A1    Dec. 13, 2012

Related U.S. Application Data

(60) Provisional application No. 61/403,522, filed on Sep. 17, 2010.

(51) Int. Cl.
*F16L 7/00*    (2006.01)
*B01D 46/02*   (2006.01)
*B01D 46/00*   (2006.01)

(52) U.S. Cl.
CPC ............ *B01D 46/02* (2013.01); *B01D 46/0024* (2013.01)
USPC ......................................... 285/123.3; 55/378

(58) Field of Classification Search
USPC .................. 285/331, 417, 903, 371, 7, 123.3; 55/373, 378, 379, 369, 374, 375, 376, 55/377
See application file for complete search history.

(56) References Cited

U.S. PATENT DOCUMENTS

| | | | | |
|---|---|---|---|---|
| 2,349,043 A * | 5/1944 | Raymond | ....................... | 55/379 |
| 2,514,280 A * | 7/1950 | Hammell | ....................... | 55/378 |
| 3,170,777 A * | 2/1965 | Held | ............................... | 55/379 |
| 3,283,907 A * | 11/1966 | Whiting | ....................... | 210/234 |
| 4,073,632 A * | 2/1978 | Reinauer et al. | .................. | 55/374 |
| 5,057,131 A * | 10/1991 | Lackner et al. | .................. | 55/378 |
| 5,221,303 A * | 6/1993 | Guhne et al. | .................... | 55/378 |
| 5,484,529 A * | 1/1996 | Malugade et al. | .............. | 55/379 |
| 5,622,623 A | 4/1997 | Stone | ........................... | 210/232 |
| 5,651,307 A | 7/1997 | Reny | ............................. | 100/116 |
| 5,725,621 A * | 3/1998 | Pruette et al. | ................... | 55/377 |
| 5,730,766 A * | 3/1998 | Clements | ....................... | 55/379 |
| 6,371,154 B1 * | 4/2002 | Kesterman et al. | ............ | 285/903 |
| 6,502,866 B1 * | 1/2003 | Hujisawa et al. | .............. | 285/903 |
| 6,676,722 B1 * | 1/2004 | Clements et al. | ............... | 55/378 |
| 6,726,735 B1 * | 4/2004 | Oussoren et al. | ............... | 55/377 |
| 6,858,052 B2 * | 2/2005 | Clements | ........................ | 55/377 |
| 6,926,827 B2 | 8/2005 | Gruca et al. | ................... | 210/234 |
| 6,941,630 B2 | 9/2005 | Wynn | ............................. | 29/401.1 |
| 7,909,175 B2 | 3/2011 | Gutman et al. | ................ | 210/450 |
| 2004/0217045 A1 * | 11/2004 | Gruca et al. | ................... | 210/235 |
| 2009/0230047 A1 * | 9/2009 | Treyz | ............................. | 210/234 |

* cited by examiner

*Primary Examiner* — David E Bochna
(74) *Attorney, Agent, or Firm* — Gerhard W. Thielman, Esq (57) ABSTRACT

An axi-symmetric adapter is provided for attaching to a pre-filter bag as a pre-filter assembly for use with chemical, biological, and radiological filtration systems. The bag has an annular retention ring, with the assembly being insertable into a cavity of an M98 Filter Bank or other Navy-designated Collective Protection System filter housing. The adapter includes tang, groove, flange mezzanine rings. The tang ring has an exterior bevel edge and terminates a reverse side of the adapter. The groove ring possesses inner and outer cylindrical walls that define a circular channel and terminate an obverse side of adapter. The flange ring extends radially inward from the inner cylindrical wall for engaging the retention ring. The mezzanine ring connects the flange and groove rings together.

9 Claims, 7 Drawing Sheets

ADAPTER RING FOR PRE-FILTER IN CHEMICAL, BIOLOGICAL AND RADIOLOGICAL ENVIRONMENTS

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

CROSS REFERENCE TO RELATED APPLICATION

Pursuant to 35 U.S.C. §119, the benefit of priority from provisional application 61/403,522, with a filing date of Sep. 16, 2010, is claimed for this non-provisional application.

BACKGROUND

The invention relates generally to an interface adapter for a filtration system. In particular, the invention relates to a unitary adapter ring that enables a pre-filtration bag to be removably connected to either of two configurations of filter housings for shipboard protective collection systems.

Chemical, biological, and radiological (CBR) weapons pose a threat to U.S. Navy ships from various quarters. The Shipboard Collective Protection System (CPS) provides defense against this threat with a limited maintenance burden on the crew as compared to alternative systems.

Supply air is filtered against particulates, e.g., chemical aerosols and biological and radiological particles, using high-efficiency particulate arresting (HEPA) filters installed in a Collective Protection (ColPro) room. Naval shipboard systems employ a Filter Bank, each housing a series of three annular 200 cubic-feet-per-minute (CFM) M98 gas/particulate filter sets. ColPro has been applied to all DDG-51 (U.S.S. Arleigh Burke), LHA-1 (U.S.S. Tarawa), LHD1 (U.S.S. Wasp) and LPD-17 (U.S.S. San Antonio) class ships, and selected TAOE-6 (U.S.N.S. Supply) and LSD-41 (U.S.S. Whidbey Island) class ships.

To extend the replacement interval of the M98 filter sets, the Filter Bank includes cylindrical pre-filters to reduce the dust load of the inlet air prior to HEPA filtration. When indicated by a CBR filter differential pressure gauge, the pre-filter bags are removed, and replacements installed. These pre-filters are snapped in and out of position by hand and do not require tools for removal or installation.

SUMMARY

Conventional arrangements to install pre-filter bags to a Filter Bank yield disadvantages addressed by various exemplary embodiments of the present invention. In particular, various exemplary embodiments provide an axi-symmetric adapter is provided for attaching to a pre-filter bag as a pre-filter assembly. The bag has an annular retention ring, with the assembly being insertable into a cavity of an M98 Filter Bank. In various exemplary embodiments, the adapter includes a flange ring, a groove ring, and a mezzanine ring.

In various embodiments, the flange ring has an exterior bevel edge. The flange ring terminates a reverse side of the adapter. In various embodiments, the groove ring possesses inner and outer cylindrical walls that define a circular channel. The groove ring terminates an obverse side of the adapter. The mezzanine ring connects the flange and groove rings together. In various embodiments, the channel can form a snug fit with a center support tube of the M98 Filter Bank. In alternative or additional embodiments, the bevel edge can form a snug fit with a center cavity of the M98 Filter Bank.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Initially, pre-filter bags required the installation of a securing bar retained by the HEPA cover nuts to lock the pre-filters in place. Loosening and tightening these nuts deleteriously alters pressure on the HEPA gaskets thereby invalidating system leak tests. The pre-filter bag employs a flexible retention ring integrated in the construction of the filter to secure the pre-filter and a fabric loop for easy removal.

For removal from the Filter Bank, the retention ring can be manually collapsed, and a loop cord pulled for retrieval of the pre-filter bag. After inserting the bag pre-filter into the Filter Bank, the retention ring can be released to expand radially into position at the Filter Bank's inlet. The retention ring eliminates need for the retention bar and enables crewmembers to remove and replace pre-filters by hand without disturbing the HEPA cover nuts, thereby obviating system recertification. This represents a significant operational cost savings to the fleet.

Two configurations of HEPA cover have seen service. The earlier housing employs a center support tube that extends axially from the inlet. The later housing lacks the support tube feature. Various exemplary embodiments provide an adapter for the bag pre-filter, irrespective of whether the center support tube is available for securing the retention ring.

Figure 1A:
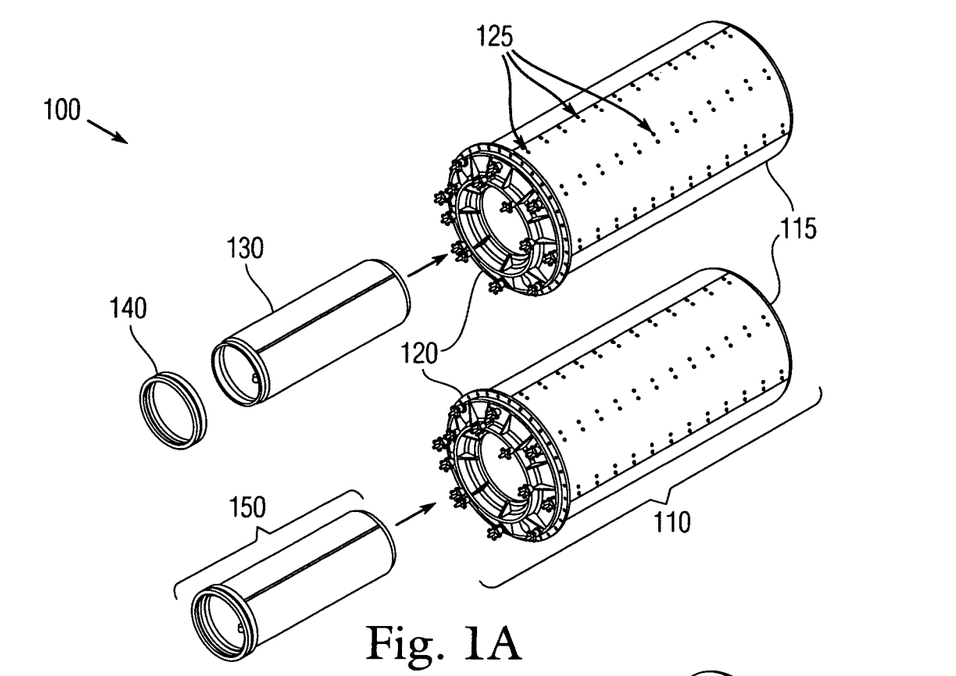
FIG. 1A is an isometric view of a later Filter Bank.
Figure 1B:
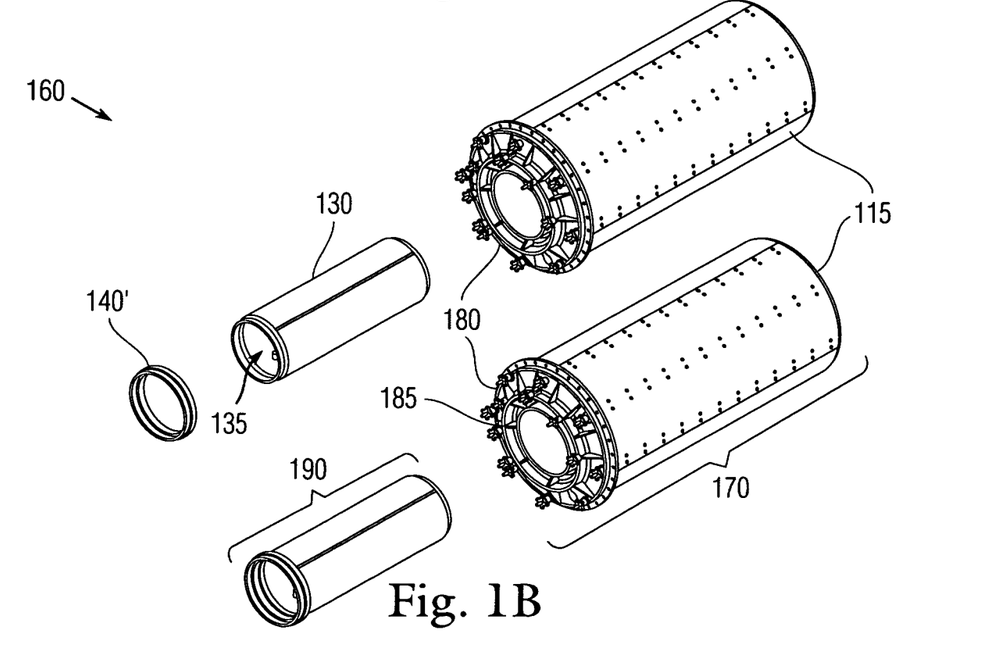
FIG. 1B is an isometric view of an earlier Filter Bank.

FIGS. 1A and 1B illustrate isometric views of the Filter Bank in both earlier and later configurations. A later version view 100 in FIG. 1A shows a Filter Bank 110 having a housing cylinder 115 and a first cover plate 120 that opens into a cylindrical cavity that functions as an air inlet. The cylinder contains three sets of annular filters and adsorbers (shown in FIG. 8 infra), through which the cavity extends axially along the cylinder 115 adhered by rivets 125 along the periphery. A pre-filter bag 130 having an open inlet 135 is insertable into the Filter Bank 110 through the cover plate 120. The retainer ring (710 in FIG. 7 infra) is disposed on the pre-filter bag 130 at the inlet 135.

An exemplary pre-filter axi-symmetric adapter 140 is shown upstream of the pre-filter bag 130. Orientation of the adapter 140 exhibits a first configuration, whereas FIG. 1B shows orientation of the adapter 140' in a second configuration. Installation of the adapter 140 into the pre-filter bag 130 provides a first pre-filter assembly 150 for insertion into the Filter Bank 110.

An earlier version view 160 in FIG. 1B shows a Filter Bank 170 having the housing cylinder 115 and a second cover plate 180 having a center support tube 185. The pre-filter bag 130 is insertable into the Filter Bank 170 through the cover plate 180. The exemplary adapter 140' is shown upstream of the pre-filter bag 130. Installation of the adapter 140' into the pre-filter bag 130 provides a second pre-filter assembly 190 for insertion into the Filter Bank 170.

Figure 2:
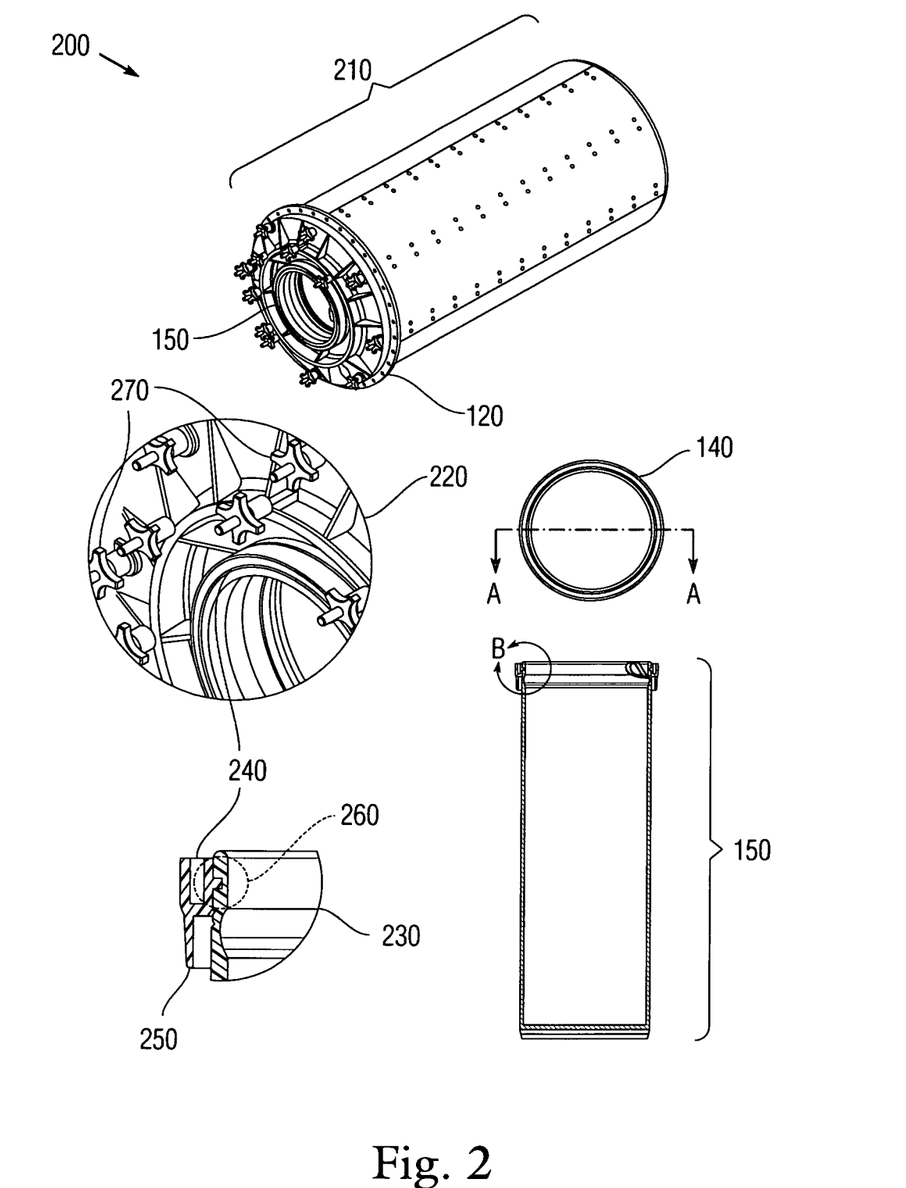
FIG. 2 is a compilation of views of the later Filter Bank and a pre-filter adapter.

FIG. 2 shows several views 200 for the later configuration. The first Filter Bank assembly 210 for the first cover plate 120 is shown in isometric view. Detail C of the assembly 210 is shown in magnification 220. The adapter 140 in the first configuration shown in plan view includes Section A-A of the pre-filter assembly 150 in elevation view. Detail B of the assembly 150 is shown in magnification 230. The peripheral cross-section of the adapter 140 features a circular channel or groove 240, an axially extending tang 250 and inward radial flange 260. Detail C also illustrates the nuts 270 that secure the cover plate 120.

Figure 3:
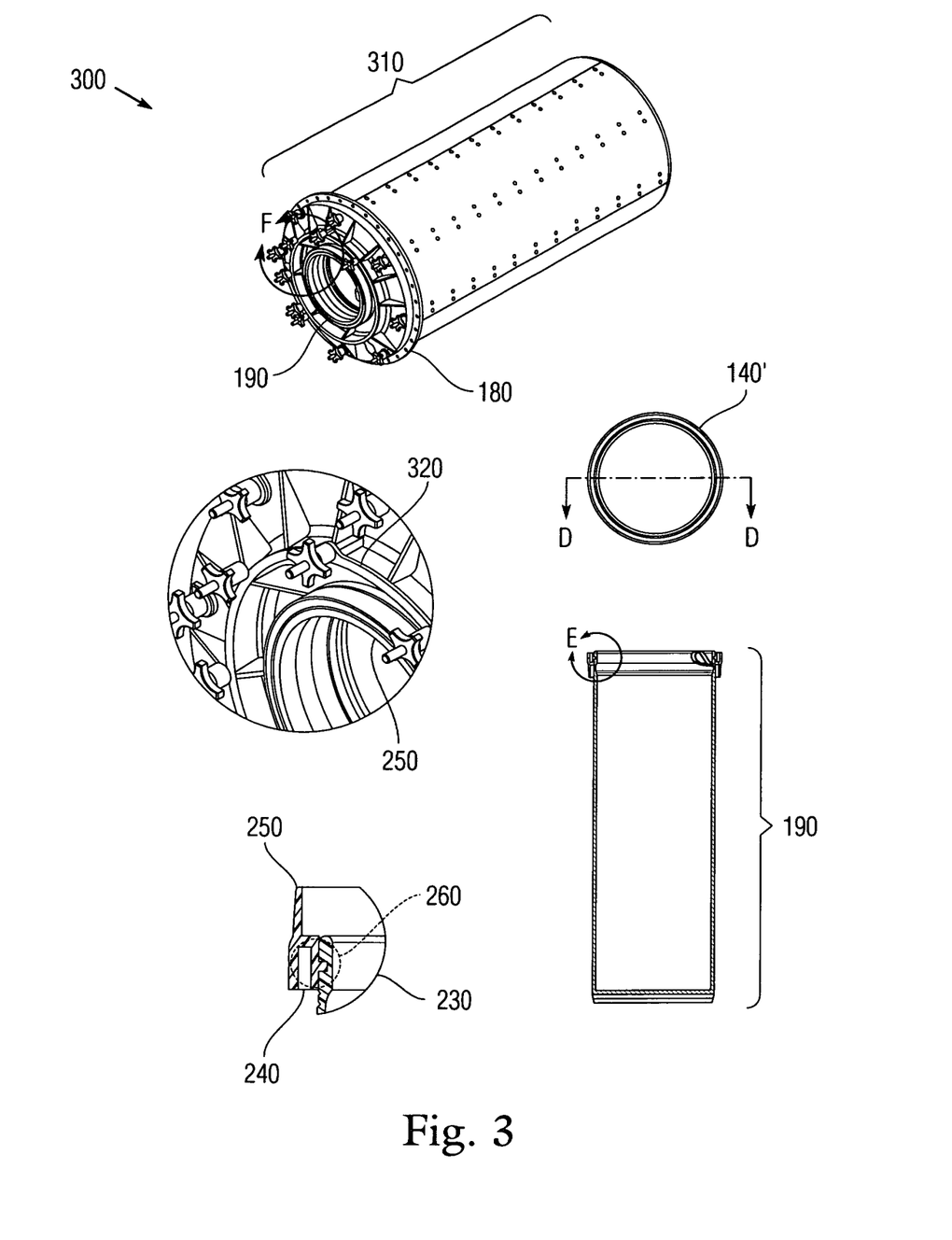
FIG. 3 is a compilation of views of the later Filter Bank and the adapter.

FIG. 3 shows several views 300 for the earlier configuration. The second Filter Bank assembly 310 for the second cover plate 180 is shown in isometric view. Detail F of the assembly 310 is shown in magnification 320. The adapter 140' in the second configuration shown in plan view includes Section DD of the pre-filter assembly 190 in elevation view. Detail E of the assembly 190 is shown in magnification 330. The peripheral cross-section of the adapter 140' features the groove 240, the axially extending tang 250 and the inward radial flange 260, albeit inverted from Detail B in views 200.

Figure 4:
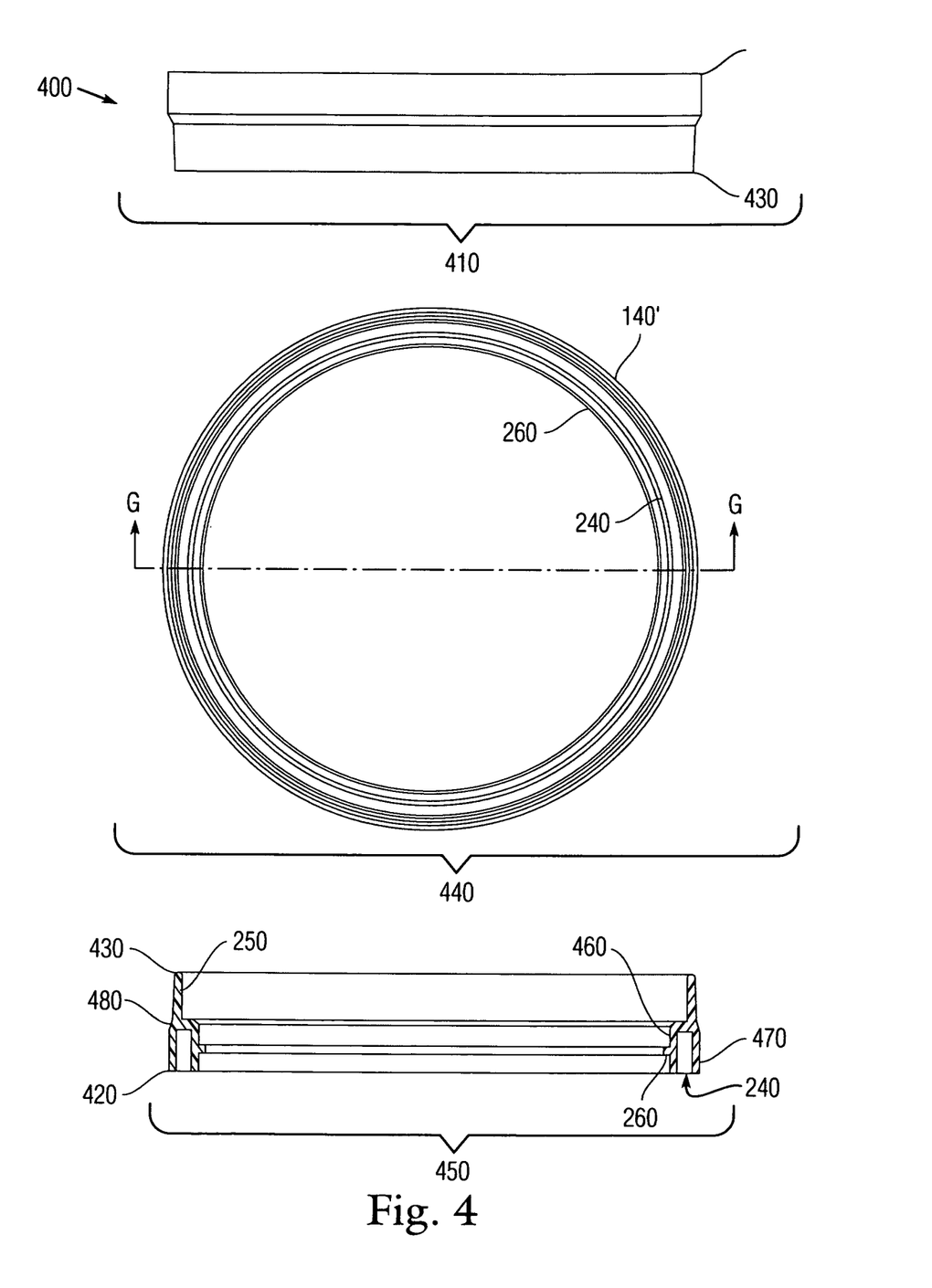
FIG. 4 is an arrangement of elevation and plan views of the adapter.

FIG. 4 shows a set of views 400 of the adapter 140. An elevation view 410 illustrates the adapter 140 with an obverse side 420 having the groove 240, and a reverse side 430 having the tang 250. A plan view 440 from the obverse side 420 shows the flange 260 and the groove 240 and includes Section G-G. A cross-section elevation view 450 provides detail from Section G-G with the ends inverted from the view 410.

The groove 240 comprises an inner wall 460, from which the flange 260 extends radially inward, and an outer wall 470. A beveled mezzanine 480 straddles between the sides 420, 430 and connects the walls 460, 470 with the flange 260. These cross-section structures constitute axi-symmetric rings that form the adapter 140 as an integrated mechanical interface for the pre-filter bag 130.

As shown in detail views 230 and 330, the inner wall 460 engages the retention ring to respectively yield either the first pre-filter assembly 150 or the second pre-filter assembly 190. The flange 260 snaps into an annular groove on the retention ring to ensure a snug fit. When the obverse side 420 faces towards the bag's inlet 135 in the second orientation of the adapter 140', the groove 240 engages the support tube 185 in the earlier configuration for the second Filter Bank 170. Otherwise when the reverse side 430 faces the inlet 135 in the first orientation of the adapter 140 for the first Filter Bank 110, the tang 250 inserts into the Filter Bank's central cavity. In this manner, the groove 240 is disposed to avoid interference with associated components in the later configuration for the first Filter Bank assembly 210.

Figure 5A:
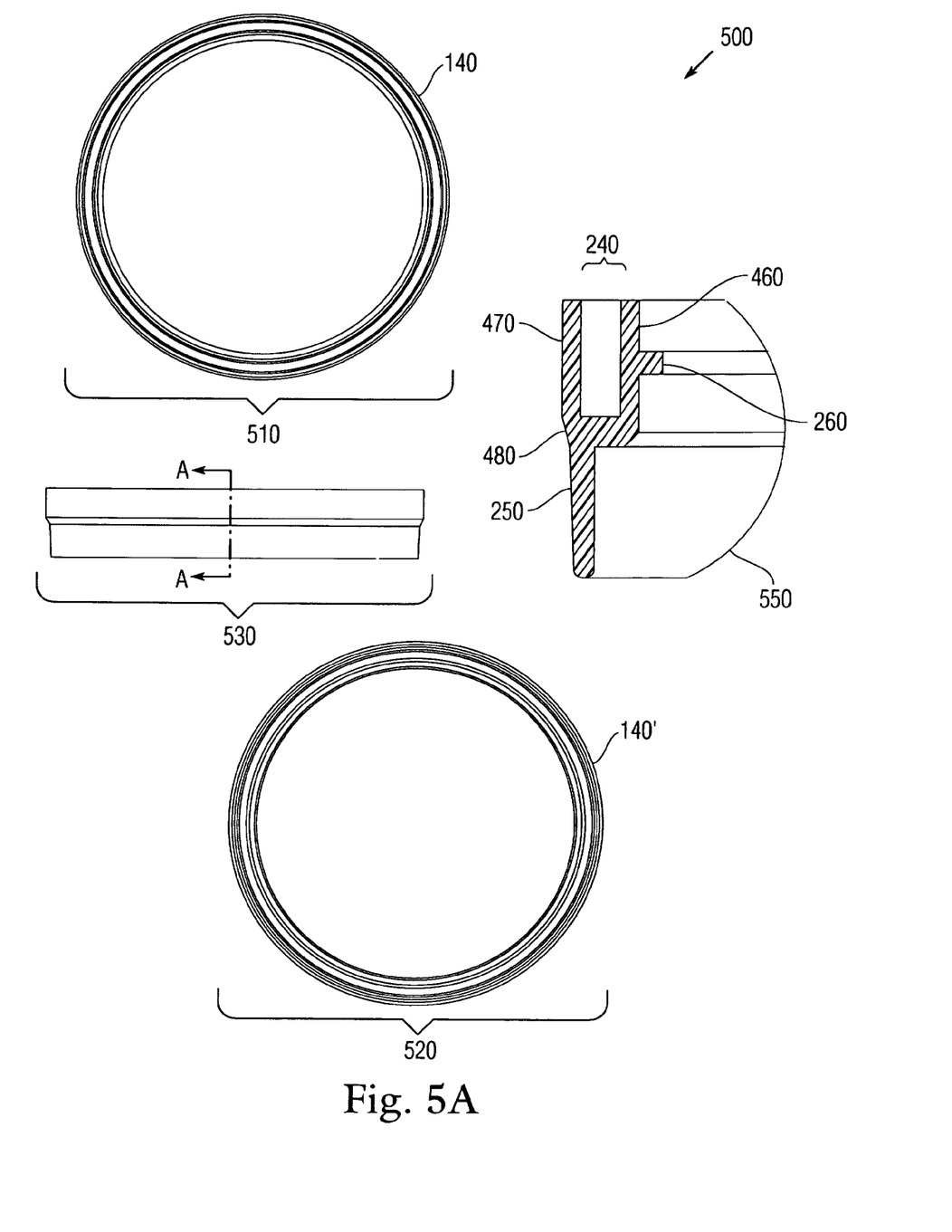
FIGS. 5A and 5B are arrangements of elevation, plan and isometric views of the adapter with exemplary dimensions.
Figure 5B:
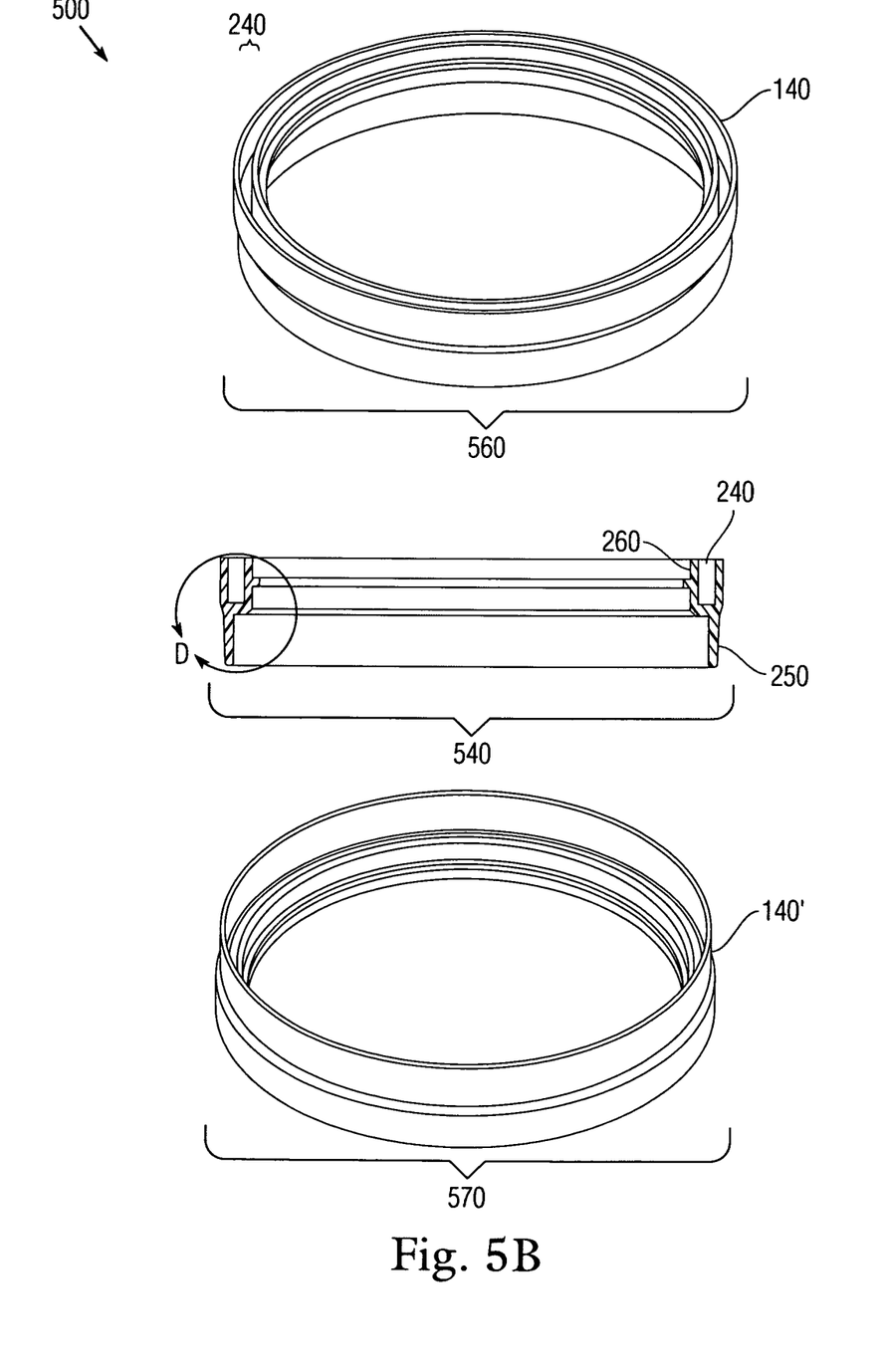

FIGS. 5A and 5B show views 500 of the adapter 140. Plan views 510 and 520 are shown of the adapter 140 and 140', in its respective first and second orientations, i.e., the reverse or obverse respective sides 430, 420 engaging the inlet 135. Exemplary outer and inner diameters of the adapter 140 are Ø12.347 inches and Ø10.603 inches for the M98 system. An elevation view 530 shows the adapter 140 in a similar manner to the view 410, and includes Section A-A, designating a detail cross-section view 540. The inner wall 460 has an exemplary diameter of Ø10.978 inches.

The view 540 includes Detail D shown in cross-section magnification 550 that identifies exemplary dimensions of the walls 460, 470, the mezzanine 480, and the tang 260, including the adapter's overall exemplary axial length of the adapter 140 as 2.375 inches. Artisans of ordinary skill will recognize that the provided dimensions are provided for illustration only in relation to the M98 system, and are not limiting with respect to other such designs. The tang 250 exhibits a slight bevel on the external edge, and provides a mechanical interface for the inlet to the first cover plate 120. The tang 250 may employ a cylindrical internal edge. The groove 240 provides a mechanical interface for the support tube 185 to the second cover plate 180.

Figure 6:
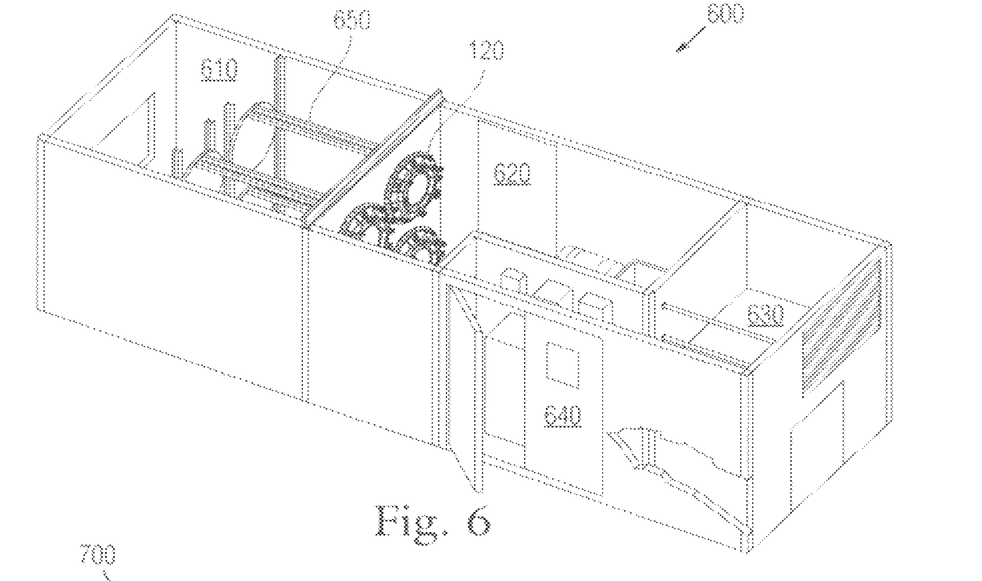
FIG. 6 is an isometric cross-sectional view of a ColPro Room.

FIG. 6 shows an isometric cross-sectional view 600 of a typical ColPro filter Room. A clean-room chamber 610 houses an array of Filter Banks through which decontaminated air enters the ship interior. An egress chamber 620 provides maintenance access to the covers 120 that extend through a wall from the clean-room chamber 610. An equipment room 630 enables entry through doors 640 to auxiliary equipment and storage of replacement components.

Figures 7, 8:
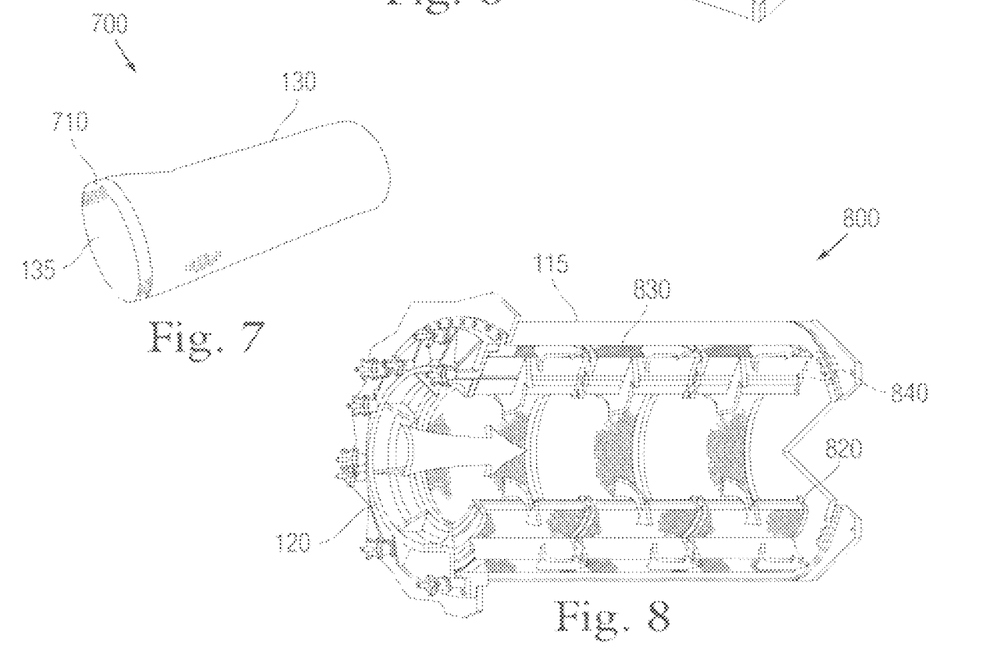
FIG. 7 is an isometric view of a Pre-Filter Bag.
FIG. 8 is an isometric cross-sectional view of a Filter Bank assembly showing air flow direction.

FIG. 7 shows an isometric view 700 of the pre-filter bag 130. A retention ring 710 is disposed at the inlet 135 of the pre-filter bag 130. The retention ring 710 includes a groove into which the flange 260 can be inserted to secure the pre-filter bag 130 to the adapter 140, which in turn attaches to the first or second cover plates 120 and 180.

FIG. 8 shows an isometric cross-sectional view 800 of the first Filter Bank assembly as taken from the later Filter Bank 110. Air 810 passes through the inlet of the first cover plate 120 and traverses radially outward through the pre-filter bag 130. The cylinder 115 houses a triple concatenation of overlapping annular M98 HEPA filter sets.

Each set contains an inner annular HEPA particulate filter 820 and an outer annular gas adsorber 830, through which the air successively passes radially. For the M98 set, the particulate filter 820 and the gas adsorber 830 have axial lengths of ~10.4 inches, and respective outer diameters of Ø18.6 inches and Ø21.4 inches. The filtered exhaust air exits the cylinder 115 through slots and travels axially along an annulus between the outer periphery of the cylinder 115 and an external shell (not shown) to exit through an angularly distributed array of orifices 840 into the ship's interior spaces at 600 CFM.

In the exemplary embodiments shown, the adapter 140 preferably represents a unitary item. Such a design does not preclude such a device as a multi-piece assembly of interlocking or otherwise attached components. The adapter 140 can be composed of a variety of rigid or semi-rigid materials. Although this item can be machined from metal stock, cast from molten form, or produced by similar methods, thermoplastic constitutes the preferred material for the adapter 140 for reasons of manufacturing cost, material density and resilience to accidental damage.

More preferably, an exemplary thermoplastic, acrylonitrile butadiene styrene (ABS) can be used to fabricate the adapter 140, such as by injection molding or other related processes. ABS thermoplastic has the chemical formula $(C_8H_8)_x \cdot (C_4H_6)_y \cdot (C_3H_3N)_z$ and constitutes a copolymer made and acrylonitrile in the presence of polybutadiene. The monomers in the ABS polymer include acrylonitrile, 1,3-butadiene and styrene, as shown in the accompanying diagram.

Benefits offered by the pre-filter bag design include reductions in the direct cost associated with the pre-filter and the storage burden on ship. First, the new design is manufactured using less expensive materials and less labor-intensive manufacturing techniques than the cylindrical pre-filter previously used in the earlier Filter Bank 110. This results in a per-housing cost reduction from $90 per filter housing to $25 per filter housing. With the longer service life of the pre-filters, this translates to a cost savings of approximately 78% annually over the cylindrical pre-filters. The adapter 140 eliminates the prior necessity of different pre-filter sizes to enable a single common pre-filter to be employed in any Navy-designed filtration system used for CBR defense. Employing a single, common pre-filter bag 130 that uses this adapter 140 provides:

1) increase in filtration performance by eliminating dust bypass gaps, thereby extending the service life of the main and more expensive CPS HEPA filters 820, 2) decrease in life cycle costs by eliminating pre-filter procurement confusion and procurement errors, reducing maintenance labor and cost, reducing the logistics burden, and saving money by reducing the manufacturing costs of the pre-filters used in these systems, and 3) elimination of three different pre-filter sizes (and associated costs) from the Navy stock system, replacing them with a single size pre-filter.

There are currently three different sizes of pre-filters used on Navy ships or any of the many buildings and shelters in the United States and around the world that use the Navy-designed CPS to protect people and equipment from CBR contamination. Each of the three pre-filter sizes corresponds to a different filter housing design or use. There is one pre-filter size for older filter housings that use a center support tube 185, another pre-filter size for newer housings that lacks the center support tube 185, and another pre-filter size for new construction applications where the main filters have not yet been installed.

Each of these three pre-filter sizes is of similar construction and appears somewhat similar in size. However, each size varies slightly in length and diameter, and the pre-filter sizes are not interchangeable. If the wrong pre-filter size is procured and installed, the result will be a poorly fitting pre-filter with dust bypass gaps, rendering it ineffective at serving its main purpose, which is to protect and extend the service life of the expensive CBR filters 820 and 830 in the CPS. Observations of CPS filtration systems on operational Navy ships have shown an abundance of wrong-size pre-filters and/or poorly fitting pre-filters, and have resulted in ineffective dust load protection and premature and expensive replacement of the expensive CBR filters.

For installation, the following options are available with the pre-filter adapter 140.

1. Filter Bank 170 with a center support tube 185: Place the grooved obverse side 420 of the adapter 140 directly over the tube 185 and gently push until the adapter 140 is snug on the tube 185. Form a U-shape with the outer snap band (retention ring 710) by pushing in its periphery to decrease its diameter. Insert the pre-filter bag 130 into the housing 180 until the center of the snap band aligns with the raised bead (flange 260) on the adapter 140. Release the U-shape so that the center of the snap band "snaps" into place on the raised bead.

2. Filter Bank 110 without a center tube support 185: Place the beveled reverse side 430 of the adapter 140 directly into the center of the housing 120 and gently push until the adapter 140 is snug on the housing 120. Form a U-shape with the outer snap band (retention ring 710). Insert the pre-filter bag 130 into the housing 120 until the center of the snap band aligns with the raised. Release the U-shape so that the center of the snap band "snaps" into place.

3. New construction filter housing (with no CBR filters installed): Same procedure as above, depending on being with or without the center support tube.

Using this exemplary adapter 140 reduces pre-filter designs to a single size, thereby eliminating pre-filter size confusion, procurement errors, and subsequent premature and expensive CBR filter replacement. This reduces pre-filter manufacturing costs by eliminating at least two alternate sizes and in preference for only a single common pre-filter size and manufacturing method.

One useful feature of the adapter 140 is the incorporation of an inner raised bead that allows the use of filter industry standard snap bands. Previous conventional Navy pre-filters used a custom-sized steel band that was relatively difficult to manufacture and had to have a very tight tolerance. If these steel bands had an error of even 0.11 inch off in diameter, which has often been the case, the result is a pre-filter that does not fit correctly and exhibits major dust bypass gaps to the detriment of the CBR filters. Unlike the steel band, the plastic snap band (retention ring 710) enables minor variations in tolerance and provides an appropriate snug fit with no bypass gaps. The plastic snap band material is also inexpensive compared to the custom-manufactured steel band, resulting in decreased pre-filter procurement cost.

Another advantage over conventional pre-filters is the ability to easily clean the pre-filters when exposed to dust storms that plague the Persian Gulf arena. When the pre-filter bag 130 becomes loaded with excessive dust, the adapter 140 can be easily removed with the pre-filter 130 still attached, taken to an outside area, turned so that the adapter 140 is at the lower end, and bounced off the deck several times to easily shake loose and eliminate the excessive dust. The refreshed pre-filter 130 with attached adapter 140 can then be returned to be readily and snugly inserted into the housing 110, 170 for re-use.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. An axi-symmetric adapter for attaching to a pre-filter bag as a pre-filter assembly, said bag having an annular retention ring that includes an annular retention groove, said assembly being insertable into a cavity of an M98 Filter Bank, said adapter comprising:
   a tang ring having an exterior bevel edge, said tang ring terminating a reverse side of the adapter;
   a groove ring having inner and outer cylindrical walls that define a circular channel, said groove ring terminating an obverse side of the adapter,
   a flange ring extending radially inward from said inner cylindrical wall of said groove ring for engaging the retention groove of the retention ring; and
   a mezzanine ring connecting said tang and groove rings together, wherein a maximum edge diameter of said exterior bevel edge is less than an outer groove diameter of said outer cylindrical wall.

2. The adapter according to claim 1, wherein said adapter is composed of a thermoplastic.

3. The adapter according to claim 2, wherein said adapter is composed of acrylonitrile butadiene styrene.

4. The adapter according to claim 1, wherein said adapter has outer and inner diameters of Ø12.347 inches and Ø10.603 inches, respectively.

5. The adapter according to claim 1, wherein said bevel edge can form a snug fit with a center cavity of the M98 Fitter Bank.

6. The adapter according to claim 1, wherein said channel can form a snug fit with a center support tube of the M98 Filter Bank, and said bevel edge can form a snug fit with a center cavity of the M98 Filter Bank absent said center support tube.

7. The adapter according to claim 1, wherein said tang ring has an interior cylindrical edge.

8. The adapter according to claim 7, wherein an inner edge diameter of said interior cylindrical edge is greater than an inner groove diameter of said inner cylindrical wall.

9. The adapter according to claim 1, wherein said tang ring is unitary.

* * * * *